(12) United States Patent
Al-Nakhli et al.

(10) Patent No.: US 11,339,319 B2
(45) Date of Patent: May 24, 2022

(54) REDUCTION OF BREAKDOWN PRESSURE BY FILTER CAKE REMOVAL USING THERMOCHEMICALS

(71) Applicants: SAUDI ARABIAN OIL COMPANY, Dhahran (SA); KING FAHAD UNIVERSITY OF PETROLEUM & MINERALS, Dhahran (SA)

(72) Inventors: Ayman R. Al-Nakhli, Dhahran (SA); Mohamed Ahmed Nasr El Din Mahmoud, Dhahran (SA); Abdulazeez Abdulraheem, Dhahran (SA); Zeeshan Tariq, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 16/825,897

(22) Filed: Mar. 20, 2020

(65) Prior Publication Data
US 2021/0292635 A1    Sep. 23, 2021

(51) Int. Cl.
| | | |
|---|---|---|
| *C09K 8/536* | (2006.01) | |
| *C09K 8/66* | (2006.01) | |
| *C09K 8/68* | (2006.01) | |
| *E21B 37/00* | (2006.01) | |

(52) U.S. Cl.
CPC .......... *C09K 8/536* (2013.01); *C09K 8/665* (2013.01); *C09K 8/68* (2013.01); *E21B 37/00* (2013.01)

(58) Field of Classification Search
None
See application file for complete search history.

(56) References Cited

U.S. PATENT DOCUMENTS

| | | | |
|---|---|---|---|
| 4,846,277 A | 7/1989 | Khalil et al. | |
| 7,721,804 B2* | 5/2010 | Duenckel | C09K 8/805 166/308.1 |
| 9,963,631 B2 | 5/2018 | Al-Nakhli et al. | |
| 10,053,614 B2 | 8/2018 | Al-Nakhli et al. | |
| 2007/0281868 A1* | 12/2007 | Pauls | C09K 8/76 507/213 |
| 2009/0042750 A1* | 2/2009 | Pauls | C09K 8/74 507/213 |
| 2010/0323933 A1* | 12/2010 | Fuller | C09K 8/528 507/261 |

(Continued)

OTHER PUBLICATIONS

Ayman R. Al-Nakhli et al, 2013 "Chemically—Induced Pressure Pulse to Increase Stimulated Reservoir Volume in Unconventional Reservoirs". URTEC-1922369 (19 pages).

(Continued)

*Primary Examiner* — John J Figueroa
(74) *Attorney, Agent, or Firm* — Osha Bergman Watanabe & Burton LLP

(57) ABSTRACT

A method for the simultaneous removal of filter cake from a wellbore and fracturing of the wellbore using a mixture including a chelating agent and a thermochemical. The method including feeding a mixture into the wellbore, contacting the filter cake with the mixture, reacting the chelating agent and the thermochemical to produce heat and pressure, removing the filter cake from the wellbore, and creating microfractures in the wellbore using pressure produced from the reacting.

11 Claims, 3 Drawing Sheets

(56) References Cited

U.S. PATENT DOCUMENTS

| | | | |
|---|---|---|---|
| 2013/0210684 A1 | 8/2013 | Ballard | |
| 2013/0213638 A1 | 8/2013 | Keller et al. | |
| 2013/0228334 A1* | 9/2013 | Jiang | C09K 8/685 |
| | | | 166/300 |
| 2014/0121136 A1* | 5/2014 | Mirakyan | C09K 8/685 |
| | | | 507/201 |
| 2014/0144632 A1 | 5/2014 | Zavolzhski et al. | |
| 2014/0151042 A1 | 6/2014 | Faugerstrom et al. | |
| 2014/0290951 A1 | 10/2014 | Al-Taq et al. | |
| 2014/0342953 A1* | 11/2014 | Reyes | C09K 8/72 |
| | | | 507/240 |
| 2015/0000912 A1 | 1/2015 | Choudhary et al. | |
| 2015/0300143 A1 | 10/2015 | Al-Nakhli et al. | |
| 2016/0264850 A1* | 9/2016 | Okunola | C09K 8/68 |
| 2016/0362596 A1* | 12/2016 | Socci | C09K 8/52 |
| 2017/0145289 A1 | 5/2017 | Ba Geri et al. | |
| 2019/0016947 A1 | 1/2019 | Mahmoud et al. | |

OTHER PUBLICATIONS

Pearson, C. Mark et al. "An Investigation Into The Use of High Pressure Nitrogen Breakdown Treatments Prior to Hydraulic Fracturing" Society of Petroleum Engineers 1996 (6 pages).

Bybee, Karen et al. "Hydraulic Fracturing in the Ghawar Field Carbonate and Sandstone Reservoirs" SPE 77677 Mar. 2003 pp. 47-48 (2 pages).

Falser, Simon et al. "Reducing breakdown pressure and fracture tortuosity by in-plane perforations and cyclic pressure ramping" ARMA 16-191, Shell International Exploration & Production, Houston, USA 2016 (9 pages).

International Search Report issued in International Application No. PCT/US2020/028960, dated Dec. 7, 2020 (4 pages).

Written Opinion issued in International Application No. PCT/US2020/028960, dated Dec. 7, 2020 (7 pages).

AlBahrani, Hussain el al. "Drilling Influences on Formation Breakdown in Hydraulic Fracturing" SPE-192286-MS, Society of Petroleum Engineers, 2018 (18 pages).

* cited by examiner

REDUCTION OF BREAKDOWN PRESSURE BY FILTER CAKE REMOVAL USING THERMOCHEMICALS

BACKGROUND

In the drilling of oil wells, drilling fluid is used to aid in the drilling of boreholes into the earth. The liquid drilling fluids, which are often referred to as drilling muds, are classified into three main types of muds. They are (1) water-based muds, which can be either dispersed or non-dispersed, (2) non-aqueous muds, usually referred to as oil-based mud and (3) gaseous drilling fluid which includes a wide range of gaseous materials.

The drilling fluid serves many roles, including providing a hydrostatic pressure to prevent the fluids in the formation from entering into the wellbore, keeping the drill bit cool and clean during the drilling operation, the carrying out of drill cuttings and to suspend the drill cuttings when drilling is halted during removal and re-entry of the drilling assembly. The particular drilling fluid or mud that is employed is chosen carefully for its particular function in to order avoid damage to the reservoir formation, limit corrosion and determine filtration rate and filter cake properties.

During the drilling operation, reservoir drilling fluid is circulated within the drilling equipment to cool the drill bit, reduce friction between the drill string and the sides of the borehole, and also to form a filter cake to prevent filtrate leak-off into the formation. The driving force for the formation of the filter cake is the higher pressure applied to maintain the stability of the borehole.

Well cleanup is the first stage in well completion operations, and in this process the drilling fluid filter cake is cleaned from the well. Drilling fluid filter cake is formed during the drilling process in the overbalanced drilling operations due to the difference between the hydrostatic drilling fluid pressure and reservoir pressure. This pressure difference will form an impermeable filter cake and thin layer that will prevent the flow of oil and gas from the reservoir to the wellbore. The drilling fluid residue (the impermeable thin layer or filter cake) should be removed during the well cleanup operations in order to allow the reservoir fluids to flow from the reservoir to the wellbore and then to the surface.

The drilling fluid also will cause damage to the reservoir due to the invasion of its base fluid (water or oil) and some of the weighting materials, polymers, etc. These ingredients of the drilling fluid (weighting materials, base fluid, polymers, etc.) will flow through the reservoir until the filter cake is formed. The flow of these ingredients to the reservoir will form a layer of reduced permeability around the wellbore; this layer of reduced permeability is called a skin. In addition to the skin damage, other damaging mechanisms can be introduced during the drilling process such as wettability alteration in the near-wellbore area, formation of emulsions, and clay swelling. The problem of well cleanup becomes severe and more difficult in horizontal wells compared to vertical wells. This can be attributed to the longer contact between the drilling fluid and the reservoir section during horizontal drilling.

The thin layer, impermeable filter cake will impose an additional resistance to the formation fracturing, especially in long and extended reach horizontal well. This layer adds more strength to the wellbore and it will increase the breakdown pressure required to break the reservoir in tight formations as well as in permeable formations.

SUMMARY

In one aspect, embodiments disclosed herein relate to a method for the simultaneous removal of filter cake from a wellbore and fracturing of the wellbore using a mixture including a chelating agent and a thermochemical. The method including feeding a mixture into the wellbore, contacting the filter cake with the mixture, reacting the chelating agent and the thermochemical to produce heat and pressure, removing the filter cake from the wellbore, and creating microfractures in the wellbore using pressure produced from the reacting.

In other aspects, embodiments disclosed herein relate to a composition, including a chelating agent and a thermochemical, for the simultaneous removal of filter cake from a wellbore and fracturing of the wellbore.

Other aspects and advantages will be apparent from the following description and the appended claims.

DETAILED DESCRIPTION

Figure 1:
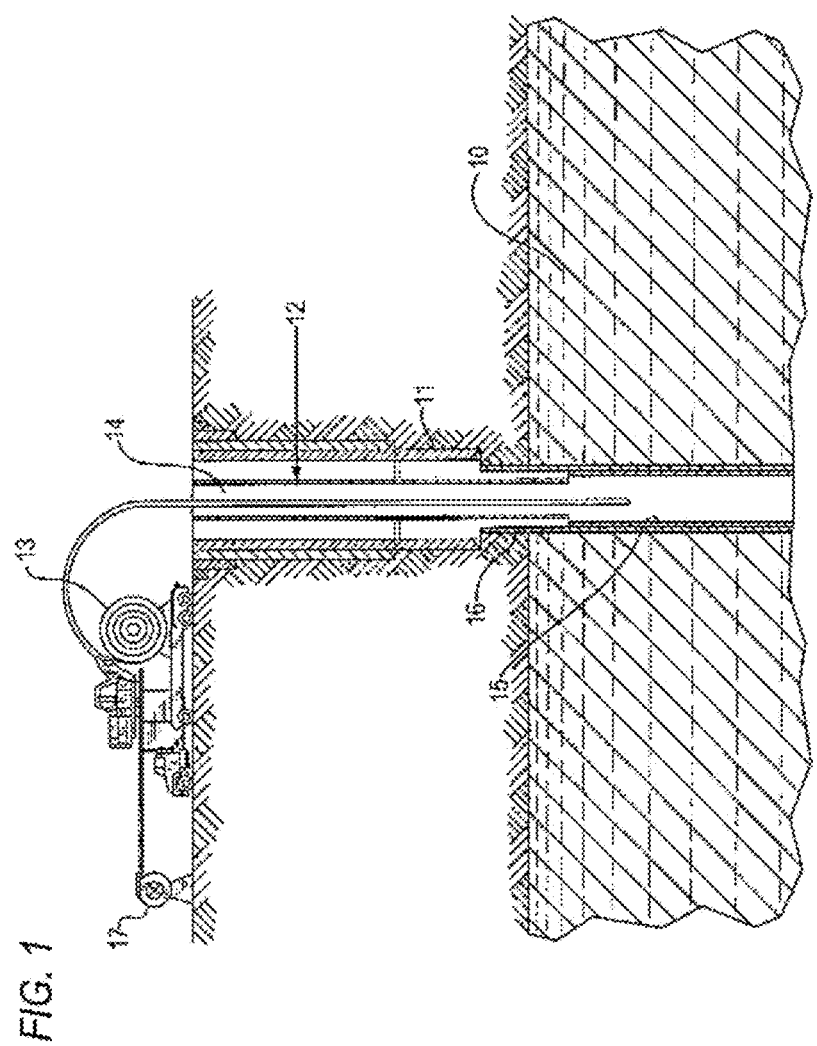
FIG. 1 is an illustration of a method of removing filter cake according to one or more embodiments disclosed herein.

As noted above, well cleanup is the first stage in well completion operations. The drilling fluid residue (the impermeable thin layer or filter cake) is desired to be removed during the well cleanup operations in order to allow the reservoir fluids to flow from the reservoir to the wellbore and then to the surface.

Filter cake properties such as thickness, toughness, slickness and permeability are important because the cake that forms on permeable zone in the wellbore, can cause the pipe to stick and other drilling problems. If the filter cake created during the drilling process is not removed prior to or during completion of the well, reservoir productivity will be compromised.

Inefficient removal of filter cake will impose a difficulty for the fracture operations after drilling because filter cake impermeable features will increase the required pressure to fracture formations. Failures to breakdown formations may be due to existing filter cake.

Accordingly, disclosed herein are methods and systems to reduce breakdown pressure by removal of the impermeable layer of filter cake. The process may lead to a complete removal of the filter cake by using thermochemical treatment and a chelating agent for both oil and water based drilling fluid weighted by barite, calcite, ilmenite, manganese tetra oxide, etc. Lab testing has indicated that when removing filter cake by thermochemicals with chelating agents, breakdown pressure may be reduced by 85%.

According to one or more methods disclosed herein is provided a method of removing a filter cake from a wellbore by contacting the filter cake with a mixture including a chelating agent and a thermochemical.

The chelating agent may be a chemical that forms soluble, complex molecules with certain metal ions, inactivating the ions so that they cannot normally react with other elements or ions to produce precipitates or scale. For example, chelating agents useful in embodiments herein may include ethylenediaminetetraacetic acid (EDTA); diethylenetriaminepentaacetic acid (DTPA); N(hydroxyethyl)ethylenediaminetriacetic acid (HEDTA); nitrilotriacetic acid (NTA); ethylenediamine-N,N'-disuccinic acid (EDDS); L-glutamic acid N,N-diacetic acid (GLDA); and methylglycinediacetic acid (MGDA); 6-[[16-[(6-carboxypyridin-2-yl)methyl]-1,4,10,13-tetraoxa-7,16-diazacyclooctadec-7-yl]methyl]-4-isothiocyanatopyridine-2-carboxylic acid (MACROPA), hydrochloric acid, formic acid, acetic acid, citric acid, or a combination of two or more of these acids.

The chelating agent may be used in its acidic form such as a potassium, ammonium, sodium, calcium or lithium form. The chelating agent may function to help break down the filter cake.

The thermochemical may be selected from one or more of as ammonium chloride, sodium nitrate, and ammonium persulfate, and combination thereof. For example, the thermochemical composition may be ammonium chloride and sodium nitrate, or ammonium persulfate and sodium nitrate. In embodiments where ammonium chloride and sodium nitrate are used as the thermochemical, the ratio of ammonium chloride to sodium nitrate may be from 1:4 to 4:1, such as 1:2 to 2:1, or even 1:1 on a percent by weight (%/wt) basis. In embodiments where ammonium persulfate and sodium nitrate are used as the thermochemical, the ratio of ammonium persulfate and sodium nitrate may be from 1:4 to 4:1, such as 1:2 to 2:1, or even 1:1 on a %/wt basis.

The addition of the thermochemical with the chelating agent may provide some unique advantages over the solutions of the prior art. For example, the addition of the thermochemicals according to embodiments herein have been found to generate a thermochemical pulse, or in situ increase in pressure, thereby generating microfractures within the formation while removing the filter cake. Additionally, these microfractures may lead to a breakdown pressure at, or near, the original breakdown pressure of the well before the formation of the filter cake. In some embodiments, the breakdown pressure may even be lower than the breakdown pressure of the well without the formation of filter cake. For example, after complete removal of filter cake using thermochemical and chelating agent, the breakdown pressure may be 40% less than the breakdown pressure without the removal of filter cake, 50% less than the breakdown pressure without the removal of filter cake, 60% less than the breakdown pressure without the removal of filter cake, 70% less than the breakdown pressure without the removal of filter cake, 80% less than the breakdown pressure without the removal of filter cake, or 85% less than the breakdown pressure without the removal of filter cake. Alternatively, after complete removal of filter cake using thermochemical and chelating agent, the breakdown pressure may be 10% less than the breakdown pressure of the unaltered formation (i.e., a rock without the formation of filter cake), 20% less than the breakdown pressure of the unaltered formation, 30% less than the breakdown pressure of the unaltered formation, 40% less than the breakdown pressure of the unaltered formation, or 45% less than the breakdown pressure of the unaltered formation.

The addition of the thermochemical may also disturb the filter cake, such as by releasing nitrogen gas, thereby creating a larger surface area for the chelating agent to react. This may lead to an increase in the filter cake solubility. In addition, the temperature generated from the thermochemical may accelerate the reaction of chelating agent with the filter cake and also increase its removal efficiency.

Further, in some embodiments, the chelating agent and thermochemical may require no environmental cleanup post injection by complexing with the filter cake elements, thereby staying as a ligand with no degradation or dissociation.

Turning now to FIG. 1, which is a schematic representation of one or more embodiments disclosed herein, an oil bearing zone 10 having a well 11 extending into the oil-bearing zone is illustrated. Production tubing 12 and a coiled tubing 13 extend down into a wellbore 14 which extends into the oil bearing zone 10.

During the drilling operation, a filter cake 15 is formed at the bottom of well casing 16 where the filter cake 15 meets the oil bearing reservoir 10.

Chelating agent may be injected through the production tubing 12, while thermochemical may be injected via a pump 17 through the coiled tubing 13. The chelating agent may have a concentration from 0.2M to 0.8M, such as from 0.35M to 0.55M, or such as 0.5M while the thermochemical may have a concentration from 0.1M to 3M. The chelating agent to thermochemical may be fed with a molar ratio of from 2:1 to 1:2 chelating agent to thermochemical, such as a molar ratio of 1:1. By way of example only, the chelating agent to thermochemical may be fed at a molar ratio of 1:1 with the chelating agent being 0.6M in concentration and the thermochemical being 1M in concentration, or the chelating agent being 0.6M in concentration and the thermochemical being 2M in concentration, or the chelating agent being 0.6M in concentration and the thermochemical being 3M in concentration may be used. In one or more embodiments, when EDTA, DTPA; HEDTA, NTA, EDDS, GLDA, MGD, or MACROPA is used as the chelating agent, the chelating agent may be from 0.35M to 0.55M. In one or more embodiments, when hydrochloric acid, formic acid, acetic acid, or citric acid is used as the chelating agent, the chelating agent may have a concentration from 10 wt % (2.7M) to 15 wt % (4.1M). In one or more embodiments, the chelating agent, or thermochemical, or both, may be injected at a ratio of 1 lb/hr to 500 lb/hr.

In one or more embodiments where the filter cake comprises barite, the chelating agent may be a mixture of 0.30M-0.40M EDTA and 0.30M-0.40M DTPA, such as a mixture of 0.35M EDTA and 0.35M DTPA for removal of barite filter cake removal. In other embodiments where the filter cake comprises calcium carbonate, the chelating agent may be a mixture of 0.3M to 0.5M EDTA and 0.4M to 0.6M GLDA, such as a mixture of 0.4M EDTA and 0.5M GLDA for calcium carbonate filter cake removal.

The chelating agent and thermochemical may be fed separately to the formation, and upon mixing downhole, both heat and nitrogen gas may be generated, causing the acid to dissolve the filter cake, and the thermochemical pulse to generate microfractures within the formation. Unlike the solutions in the prior art, embodiments disclosed herein using both a thermochemical and a chelating agent may be used to breakdown both water-based and oil-based filter cakes.

Examples

In one example, the field formulations were used for oil and water-based drilling fluids to form the filter cake. Tables 1 and 2 list the composition of these fluids. A barrel (bbl) is defined as 42 gallons, or approximately 159 liters.

TABLE 1

Drilling fluid formulation of the water-based drilling fluid.

| Additive | Unit | Amount |
|---|---|---|
| Water | bbl | 0.691 |
| Bentonite | lb | 4 |
| XC-Polymer | lb | 0.5 |
| KOH | lb | 0.5 |
| KCl | lb | 20.0 |
| NaCl | lb | 66 |
| Barite | lb | 352 |
| CaCO$_3$ medium | lb | 5.0 |

TABLE 2

Drilling fluid formulation of oil-based drilling fluid.

| Name | Unit | Weight % |
|---|---|---|
| Water | bbl | 12.28 |
| Oil | bbl | 24 |
| Calcite | lb | 11 |
| Barite | lb | 42.2 |
| KOH | lb | 0.05 |
| Polymer | lb | 0.07 |
| Viscosifier | lb | 5 |
| Emulsifier | lb | 5.4 |

Different cement cubicle blocks with a cement to sand ratio of 1:2 were prepared. The average porosity and permeability of the cement samples were 17.32% and 0.191 md, respectively. The blocks were 4 inches long and 4 inches wide. A synthetic bore-hole was created at the center of each block which represents the wellbore with the dimension of ¼ inch diameter and 2.5-inch depth.

Figure 2:
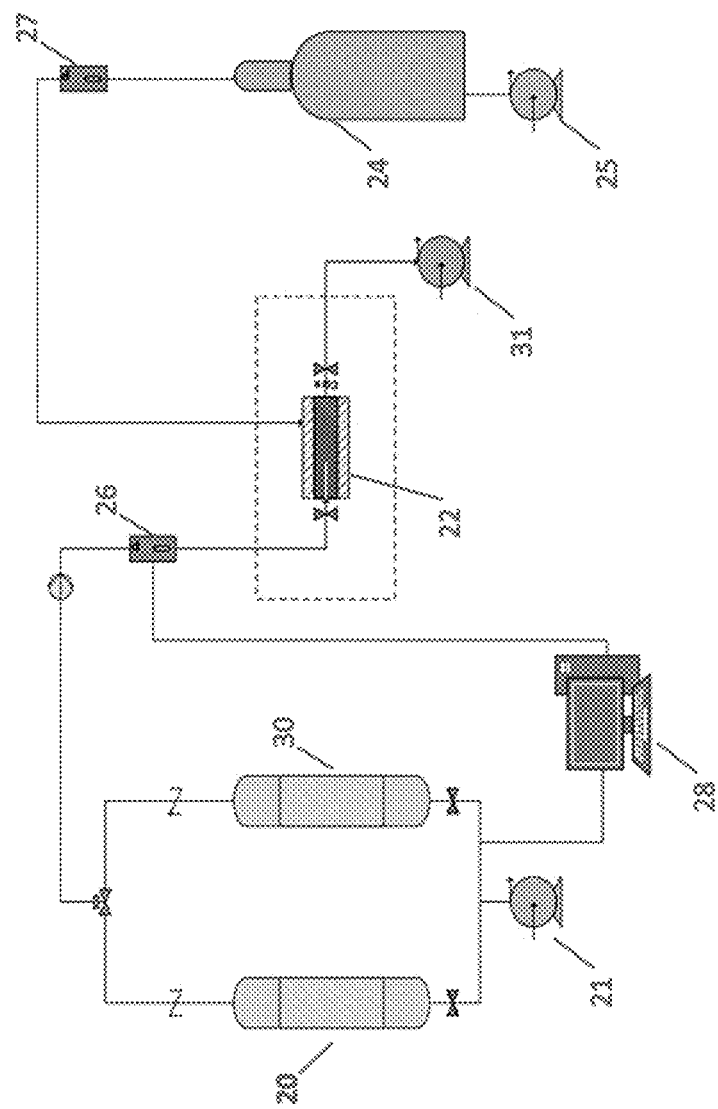
FIG. 2 is an illustration of a breakdown pressure test according to one or more embodiments disclosed herein.

FIG. 2 shows the experimental set-up that was used to form the filter cake, remove the filter cake, and perform the fracturing experiments. First the drilling fluid 20 was pumped, using pump 21, into a test cell 22 to form an impermeable filter cake with zero permeability. This was confirmed by applying pressurized gas from gas cylinder 24 using pump 25 into the drilled hole in the test cell 22. As measured by pressure gauges 26 and 27, monitored by computer system 28, the pressure did not decline and remained constant over a 10-hour time period.

After the generation of the filter cake, the same set-up was used to remove the filter cake. Thermochemical from tank 30 was combined with DTPA chelating agent at 0.6M DTPA and pH 12, to remove the filter cake formed in test cell 22. After the test was complete, the test cell 22 was evacuated using vacuum pump 31, leaving a treated rock for breakdown testing.

This test was repeated for water-based and oil-based drilling fluids.

Five different rock samples were tested for breakdown pressure. These samples were rock without filter cake, rock with filter cake, partial removal of filter cake using a method known in the art, complete removal of filter cake using the method disclosed in one or more embodiments herein, and complete removal of filter cake using DTPA alone. For the partial removal of filter cake, the process was allowed to proceed to about 45% completion before the test cell was evacuated.

Breakdown pressure was tested for the samples using water. A hole was drilled in the block with a 7 mm diameter and 50 mm length. The permeability of the block was around 1 millidarcy (md). A millidarcy is 1/1000$^{th}$ of a darcy, where a medium with a permeability of 1 darcy permits a flow of 1 cm$^3$/s of a fluid with viscosity 1 cP under a pressure gradient of 1 atm/cm acting across an area of 1 cm$^2$.

Figure 3:
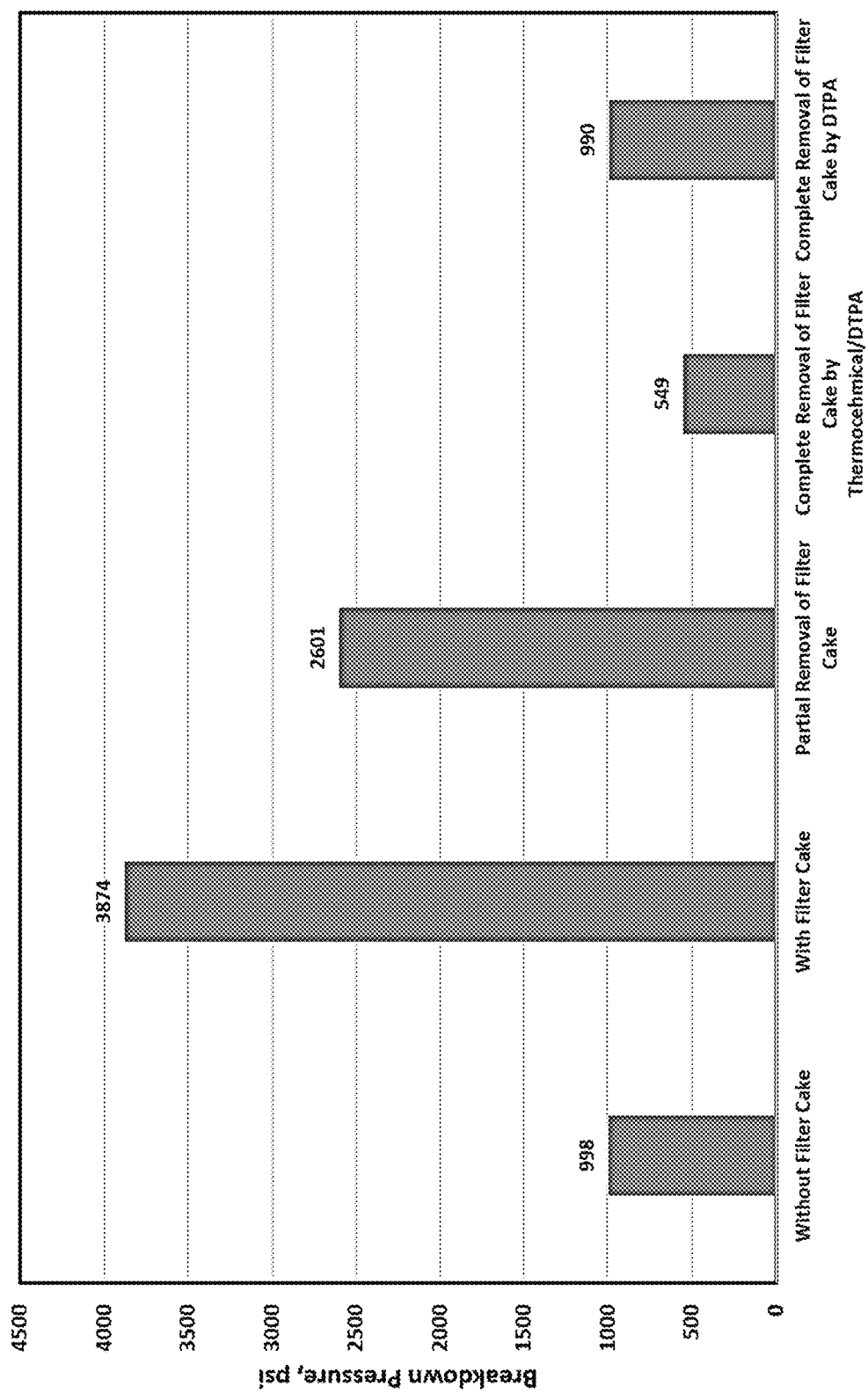
FIG. 3 is a graphic illustration of breakdown pressure of rock samples according to one or more embodiments disclosed herein.

As seen in FIG. 3, the thermochemical/DTPA treatment for the filter cake, according to one or more embodiments disclosed herein, was observed to have the lowest breakdown pressure. This is due to the formation of microfractures around the hole (wellbore) compared to the rock sample without filter cake formation.

Rock with filter cake resulted in a very high breakdown pressure due to the effect of wellbore strengthening. The filter cake increases the required breakdown pressure from 998 psia to 3874 psia. Partial removal in the filter cake resulted in a breakdown pressure of 2601 psia. A complete removal of the filter cake, using conventional DTPA treatment alone, resulted in a breakdown pressure of 990 psia. This DTPA treatment used the same 0.6M DTPA at pH 12 as was using the thermochemical/DTPA treatment. When thermochemical is combined with the 0.6M DTPA at pH 12, it resulted in a breakdown pressure of 549 psia due to the creation of the micro fracture in addition to the complete filter cake removal.

As seen, when complete removal of filter cake using the thermochemical/DTPA was performed, the resulting rock sample exhibits a breakdown pressure of 85% less than the sample containing filter cake, and 45% less than the rock sample without the formation of filter cake. Without being bound to any specific theory, this may be attributed to the thermochemical pulse generating microfractures within the rock sample.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A method for the simultaneous removal of filter cake from a wellbore and fracturing of the wellbore, the method comprising:
   feeding a mixture into the wellbore, the mixture consisting of:
   a chelating agent;
   a thermochemical, wherein the thermochemical comprises ammonium persulfate; and
   a water- or oil-based fluid;
   contacting the filter cake with the mixture;
   reacting the chelating agent and the thermochemical to produce heat and pressure;
   removing the filter cake from the wellbore; and
   creating microfractures in the wellbore using pressure produced from the reacting.

2. The method as claimed in claim 1, wherein the chelating agent is one or more selected from the group consisting of ethylenediaminetetraacetic acid (EDTA); diethylenetriaminepentaacetic acid (DTPA); N(hydroxyethyl)ethylenediaminetriacetic acid (HEDTA); nitrilotriacetic acid (NTA); ethylenediamine-N,N'-disuccinic acid (EDDS); L-glutamic acid N,N-diacetic acid (GLDA); and methylglycinediacetic acid (MGDA); 6-[[16-[(6-carboxypyridin-2-yl)methyl]-1,4,10,13-tetraoxa-7,16-diazacyclooctadec-7-yl]methyl]-4-isothiocyanatopyridine-2-carboxylic acid (MACROPA), hydrochloric acid, formic acid, acetic acid, and citric acid.

3. The method of claim 2, wherein the chelating agent has a concentration of 0.2M to 0.8M.

4. The method of claim 3, wherein the chelating agent is DTPA.

5. The method as claimed in claim 1, wherein the thermochemical further comprises one or more selected from the group consisting of ammonium chloride and sodium nitrate.

6. The method of claim 5, wherein the thermochemical is ammonium persulfate and sodium nitrate.

7. The method of claim 6, wherein the ratio of ammonium persulfate to sodium nitrate is from 1:4 to 4:1 based on %/wt.

8. The method of claim 1, wherein the filter cake is a water-based filter cake or an oil-based filter cake.

9. The method of claim 1, further comprising feeding the chelating agent and the thermochemical at a chelating agent to thermochemical molar ratio of 2:1 to 1:2.

10. The method of claim 1, wherein the chelating agent and the thermochemical are fed separately into the wellbore.

11. The method of claim 1, wherein the removal of filter cake from the wellbore results in a reduction of a breakdown pressure by 85% compared to the breakdown pressure without a formation of filter cake on the wellbore.

\* \* \* \* \*